(12) United States Patent
Bastuğ et al.

(10) Patent No.: US 8,199,793 B2
(45) Date of Patent: Jun. 12, 2012

(54) DETERMINATION OF ACTIVE SPREADING CODES AND THEIR POWERS

(75) Inventors: Ahmet Bastuğ, Istanbul (TR); Fabrizio Tomatis, Antibes (FR)

(73) Assignee: ST-Ericsson SA, Geneva (CA)

( * ) Notice: Subject to any disclaimer, the term of this patent is extended or adjusted under 35 U.S.C. 154(b) by 905 days.

(21) Appl. No.: 12/096,217

(22) PCT Filed: Dec. 5, 2006

(86) PCT No.: PCT/IB2006/054595
§ 371 (c)(1),
(2), (4) Date: Oct. 20, 2008

(87) PCT Pub. No.: WO2007/066283
PCT Pub. Date: Jun. 14, 2007

(65) Prior Publication Data
US 2009/0274198 A1   Nov. 5, 2009

(30) Foreign Application Priority Data
Dec. 16, 2005   (EP) ..................... 05301010

(51) Int. Cl.
*H04B 1/00* (2006.01)
(52) U.S. Cl. ........ 375/150; 375/136; 375/142; 375/143; 375/144; 375/148; 375/152; 375/260; 375/348
(58) Field of Classification Search ................. 375/150, 375/136, 142, 143, 144, 148, 152, 360, 348
See application file for complete search history.

(56) References Cited

U.S. PATENT DOCUMENTS

| | | | |
|---|---|---|---|
| 6,501,788 B1 * | 12/2002 | Wang et al. | 375/148 |
| 6,678,314 B2 | 1/2004 | Juntti et al. | |
| 2001/0024426 A1 | 9/2001 | Zeira et al. | |
| 2002/0057730 A1 | 5/2002 | Karlsson et al. | |
| 2002/0126741 A1 * | 9/2002 | Baum et al. | 375/144 |
| 2002/0154615 A1 | 10/2002 | Hans et al. | |

FOREIGN PATENT DOCUMENTS
WO   2006059088 A1   6/2006

OTHER PUBLICATIONS

Notification of Transmittal of the International Search Report and the Written Opinion of the International Searching Authority, or the Declaration, PCT/IB2006/054595, mailing date May 18, 2007, pp. 11.

\* cited by examiner

*Primary Examiner* — Kabir A Timory
(74) *Attorney, Agent, or Firm* — William J. Kubida; Peter J. Meza; Hogan Lovells US LLP

(57) ABSTRACT

The present invention relates to a method and a device for detecting active spreading codes for a signal in a communication system and estimating power of the active spreading codes. Further, the present invention ensures efficient interference cancellation. Multiple correlations are performed at a single level of a spreading code tree, the produced output samples are then observed at this level during a defined period, and a decision for the activity and power is met for all existing codes via extracting and processing information from these samples. At the correlation step, unitary fast Walsh Hadamard transformation is performed at practically the highest spreading factor in the system.

28 Claims, 9 Drawing Sheets

DETERMINATION OF ACTIVE SPREADING CODES AND THEIR POWERS

FIELD OF THE INVENTION

The present invention relates to the field of detection of active spreading codes for a signal in a communication system and power estimation of the active spreading codes. Such active spreading code detection may be used for interference cancellation purposes in a communication system. More particularly the present invention relates to a device for detection of active spreading codes for a signal in a communication system and estimation of powers of the active spreading codes and to a method for detection of active spreading codes and estimation of powers of the active spreading codes for a signal in a communication system, wherein a received signal comprises a sequence of data symbols that are spread in the received signal and the spreading is defined by a spreading code and/or a spreading factor.

BACKGROUND OF THE INVENTION

The world is demanding more from wireless communication technologies than ever before as more people around the world are subscribing to wireless communication. The Third-Generation (3G) wireless data services and applications, such as wireless email, web, digital picture taking/sending, assisted-GPS position location applications, video and audio streaming and TV broadcasting, are providing much more functionality than existed just a few years ago.

Code Division Multiple Access (CDMA) consistently provides better capacity for voice and data communications than other commercial mobile technologies, allowing more subscribers to connect at any given time. CDMA is a "spread spectrum" technology, allowing many users to occupy the same time and frequency allocations in a given band/space. As its name implies, Code Division Multiple Access assigns unique codes called spreading codes to each communication to differentiate it from others in the same spectrum. By the use of spreading codes, the frequency band of a transmission is spread to a chip rate which is larger than the actual data or information symbol rate. For example, if the used spreading code has the length of eight, eight symbols (referred to as "chips") are transmitted for every data symbol.

The spreading codes have the property of orthogonality, meaning in mathematical terms that the inner product or correlation of the spreading codes used for communication is zero. Orthogonality of the spreading codes guarantees that transmission of a signal or sequence of data symbols respectively which is coded by a spreading code neither creates or propagates side effects to other signals coded by other orthogonal spreading codes and corresponding to other users of a communication system. A receiver looking for a certain spreading code of a certain transmitter will take signals coded by orthogonal spreading codes as a noise of the radio frequency (RF) channel. Since spreading codes can have different length, the property of orthogonality must be given also for spreading codes of different lengths. Construction of a spreading code can be achieved by use of an orthogonal variable spreading factor (OVSF) tree as shown in FIG. 1, wherein the abbreviation SF stands for the spreading factor characterising the length of the spreading code. The spreading factor may also be expressed by a definition "chip rate"/ "data symbol rate" or by "data symbol duration"/"chip duration".

Direct sequence code division multiple access (DS-CDMA) enables the users to share the same RF channel to transmit data simultaneously. The stream of information to be transmitted is divided into small pieces, each of which is allocated to a RF channel across the spectrum. The DS-CDMA transmitter multiplies each signal of a user by a distinct code waveform. The detector receives a signal composed of the sum of all signals of all users, which overlap in time and frequency. In a conventional DS-CDMA system, a particular signal of a user is detected by correlating the entire received signal with the code waveform of the user.

Spreading codes of different users in DS-CDMA fall into possibly different levels in an OVSF tree thus providing various levels of quality of service (QoS). UMTS FDD (Universal Mobile Telecommunication System Frequency Division Duplex) downlink is a particular example where user symbols are spread by spreading factors ranging from 4 to 512. In this and other similar systems, although the transmitted user signals at the base station (BS) side are orthogonal, this orthogonality no more exists at the mobile station (MS) front-end due to the multipath effect of the propagation channel between the transmitter and the receiver where the channel consists of more than one distinct propagation path for each signal of a user. Thus, multipath is a propagation phenomenon resulting in radio signals reaching the receiving antenna by two or more paths and provides at the same time the possibility of using signals that arrive in the receivers with different time delays. In CDMA the multipath signals are combined to make an even stronger signal at the receivers. Causes of multipath include atmospheric ducting, ionospheric reflection and refraction, and reflection from terrestrial objects, such as mountains and buildings.

However, the receivers have to be able to cope with the negative effect of multipath. For this reason, there are three common approaches to circumvent the problem of the loss of orthogonality which results in interference:

1. The most straightforward and basic approach is to treat the generated interference due to multipath as an additive white gaussian noise (AWGN) and implement the conventional Rake receiver to detect symbols of a user independently from others by collecting the energy from a number of delayed forms of the received signal via correlations with the spreading code of that particular user.
2. The second approach is interference suppression, which partially brings back orthogonality via usage of chip rate channel equalisers and again estimates the symbols of a particular user independently from others via correlating with its spreading code.
3. The third approach is interference cancellation (IC). Firstly, the symbols of known active interfering spreading codes are estimated via methods encompassing one of the first two approaches. Then the estimated symbols are respread, rechannelled and deleted from the originally received signal.

For multipath environments the complexity of a receiver increases by a factor of N when N channels have to be supported.

Regarding the first approach, Rake receivers can handle only a finite number of paths of a multipath environment. Additionally, in case of M paths a Rake receiver will use M complex data correlators to correlate a received signal with the spreading code of a particular user, which is a complex and, concerning the required costs and power, an expensive approach.

Concerning the second approach, the interference is only suppressed and the required orthogonality is given only partially.

The present invention relates to the third approach where for the interference canceller it is essential to know the actual spreading codes and their powers. However, methods of the prior art representing said third approach like US20020057730-A1 and U.S. Pat. No. 6,678,314-B2 are still computationally complex and generate or cause processing delays. In order to enable fast data processing and transmission there is a continuing need for a substantially more efficient interference cancellation providing improved runtime.

In the prior art representing said third approach disclosed in US20020057730-A1 and U.S. Pat. No. 6,678,314-B2 the problem of determining the spreading sequences have been addressed. Their common approach is to detect the existence of codes by visiting several levels in the OVSF tree, doing multiple correlations at those levels and deciding for the existence of codes corresponding to the maximum correlation values. However, methods represented in both prior art documents are still computationally complex.

Moreover, in radio communications channel estimation is one of the major problems, particularly when the mobile system is subject to multipath fading, that is the transmission channel consists of more than one distinct propagation path for each signal of a user. When the CDMA technique is used to allow multiple users access to a single channel, the system is susceptible to the near-far effect. The near-far problem arises when the signals from the different users arrive at the receiver with widely varying power levels. The near-far problem has been shown to severely degrade the performance of standard single-user techniques (e.g., matched filters, correlators, etc.) in conventional CDMA systems. These systems try to limit the near-far problem with power control. However, even a small amount of the near-far effect can drastically degrade the performance of conventional receivers.

Properly estimating the spreading codes and deleting their contribution in the received signal is also beneficial for channel estimation since channel estimation quality based on correlating a known training pattern with the received noisy common pilot channel (CPICH) is also dramatically influenced by the multi-user interference.

SUMMARY OF THE INVENTION

It is therefore an object of the present invention to provide a device and a method for detecting active spreading codes for a signal in a communication system, especially in a multi-rate direct sequence code division multiple access system (DS-CDMA) where spreading codes of different users fall into possibly different levels in an orthogonal variable spreading factor (OVSF) tree, and estimating power of the active spreading codes, thereby enabling efficient interference cancellation with improved runtime.

This object is achieved by a device for detection of active spreading codes for a signal in a communication system and estimation of powers of the active spreading codes, wherein a received signal comprises a sequence of data symbols that are spread in the received signal and the spreading is defined by a spreading code and/or a spreading factor, wherein the device comprises: correlation means for performing multiple correlations at a single level of a spreading code tree and producing output samples; and activity determination and power estimation means for observing said output samples produced at said single level, deciding on activity for all existing codes, and estimating powers of active spreading codes by extracting and processing information from said output samples.

Furthermore, the above object is achieved by a method of detecting active spreading codes for a signal in a communication system and estimation of powers of the active spreading codes, wherein a received signal comprises a sequence of data symbols that are spread in the received signal and the spreading is defined by a spreading code and/or a spreading factor, wherein the method comprises: a first step of performing multiple correlations at a single level of a spreading code tree and producing output samples; and a second step of observing said output samples produced at said single level, deciding the activity for all existing codes, and estimation of the powers of the active spreading codes via extracting and processing information from said output samples.

In the present invention, both the device and the method may be used for interference cancellation in a communication system. Furthermore, the interference cancellation may be implemented in a parallel or in a serial way.

Further, the object is provided by a computer program product comprising code means for performing the steps of the above characterised method for detection of active spreading codes and estimation of powers of the active spreading codes when run on a computer controlled device.

Advantageous developments are defined in the dependent claims.

One of advantages of the present invention is the noticeable improvement of the runtime without loss of quality concerning the detection of active spreading codes and the estimation of their powers.

In the present invention, multiple correlations are performed jointly in the most efficient way at a single level, the output samples produced in this correlation step are observed at this level during a defined period and a decision is made for all existing codes via extracting and processing information from these examples.

Further, according to one advantageous development, the multiple correlations can be performed by use of unitary fast Walsh Hadamard transformation (FWHT) at practically the highest spreading factor ($L_{max}$) in the system. The use of FWHT, in the present invention, provides an obvious lower runtime complexity, especially compared to multiple independent correlations. Furthermore, the use of FWHT, in the present invention, is appropriate for implementation with custom parallel processor architectures. Additionally, the output samples produced by FWHT provide suitable statistics for determining the active spreading codes and their powers.

Further, the present invention provides various alternative ways of implementation allowing high degree of flexibility and possibility of adjustment of the method to the conditions given by the environment. The flexibility of implementation regards both the device and the method. For example, when checking the activity of the corresponding spreading codes, great latitude is allowed for an appropriate choice of the levels of the OVSF tree. Activity checking might be done in any level order. Further, the activity search can be performed by homogenous of hybrid search described in the next section more detailed. Further, implementations of the activity determination and power estimation can be done serially or block wise. And last but not least, the present invention provides multiple alternatives for the power estimation of detected spreading codes, also described in the next section in more detail.

BRIEF DESCRIPTION OF THE DRAWINGS

The present invention will be more clearly understood from the following description of the preferred embodiments of the invention read in conjunction with the attached drawings, in which.

DESCRIPTION OF THE PREFERRED EMBODIMENTS

Figure 1:
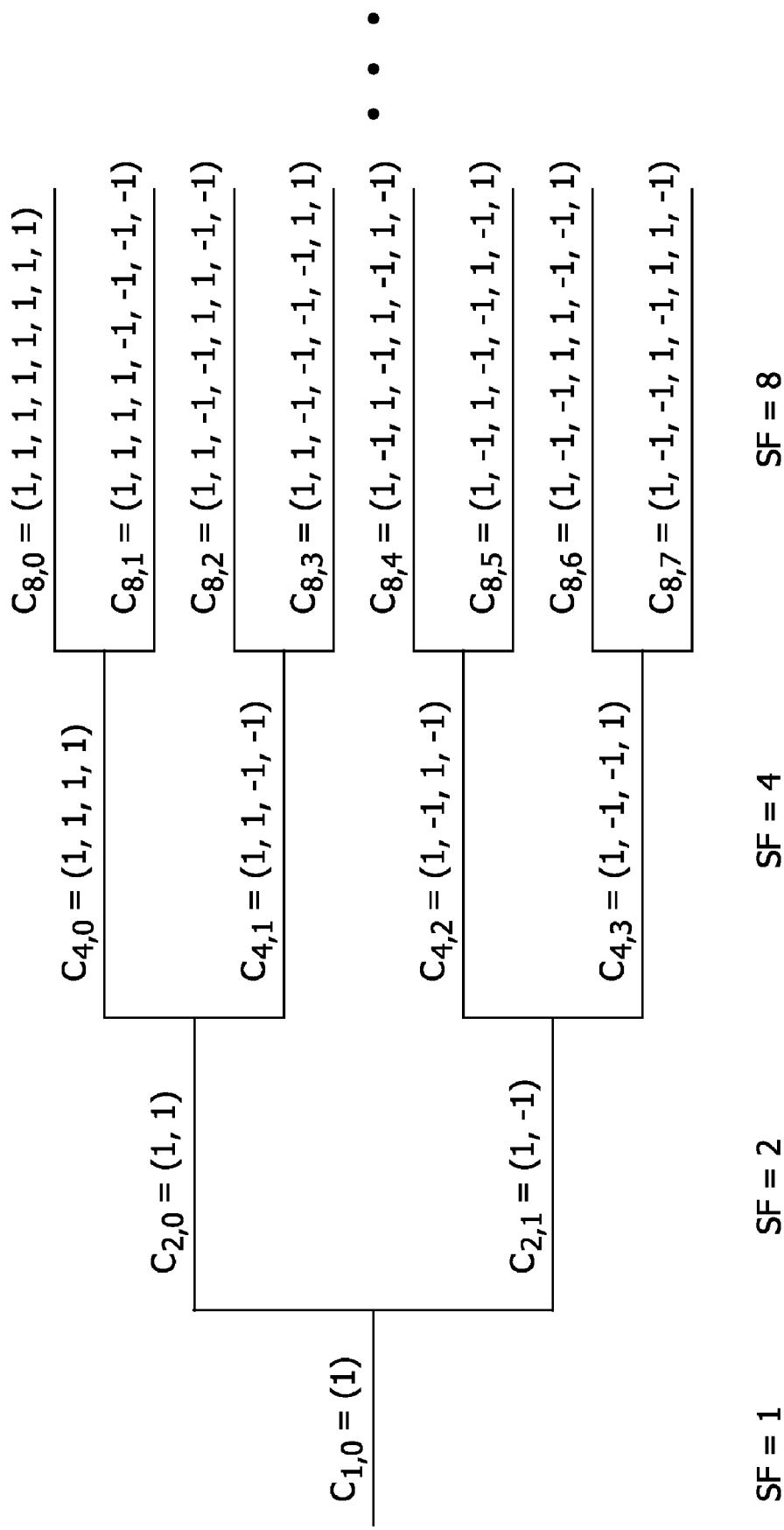
FIG. 1 shows an orthogonal variable spreading factor (OVSF) tree useful in explaining the operations of the present invention.

FIG. 1 shows an orthogonal variable spreading factor (OVSF) used in the present invention for spreading code detection. As mentioned above spreading codes are used to spread the spectrum of a transmitted signal by multiplying the data bits of the signal by the higher frequency spreading code, thus increasing the data rate of the transmitted signal. These spreading codes are formed from a code tree called orthogonal variable spreading factor tree, where all codes at a given spreading factor SF, or at a certain level of the OVSF tree, are orthogonal to each other. The use of the OVSF codes allows various spreading codes of different lengths to be orthogonal to each other. Thus, multi-rate can be modelled as multi-codes in the OVSF structure.

Figure 2:
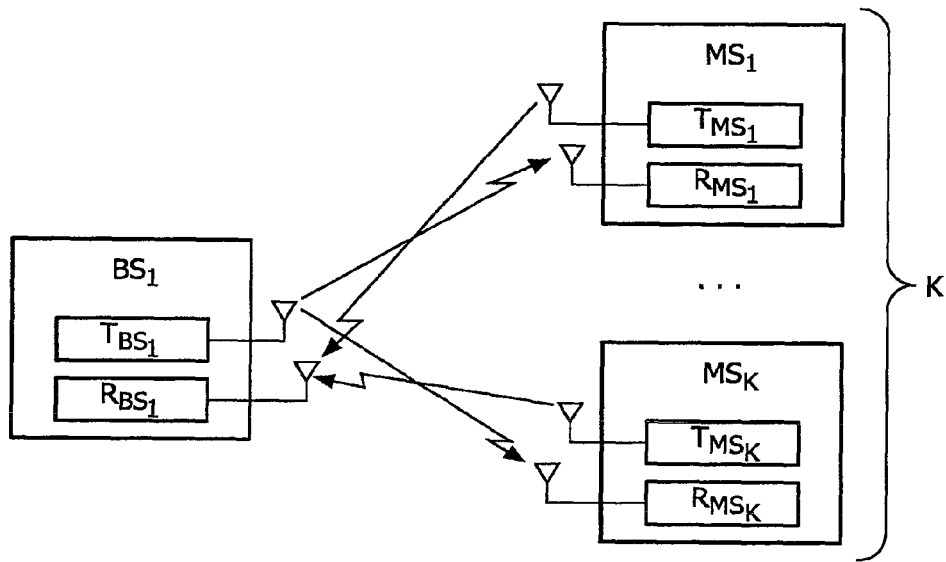
FIG. 2 shows a typical communication system useful in explaining the operations of the present invention.

FIG. 2 shows a typical communication system in which the present invention may be used. There, a CDMA system comprises a plurality of mobile or user stations ($MS_1, \ldots, MS_K$), which enables a plurality of users ($1, \ldots, K$) to communicate with a base station ($BS_1$). Each of both the base station ($BS_1$) and mobile user stations ($MS_1, \ldots, MS_K$) contain a transmitter ($T_{BS_1}, T_{MS_1}, \ldots, T_{MS_K}$) and a receiver ($R_{BS_1}, R_{MS_1}, \ldots, R_{MS_K}$). The transmitter $T_{BS_1}$ of the base station BS transmits data in a downlink, or forward link, to each of the user stations $MS_1, \ldots, MS_K$ and a receiver $R_{BS_1}$ of the base station $BS_1$ receives data in an uplink, or reverse link, from each of the mobile user stations $MS_1, \ldots, MS_K$. The air space between the base station $BS_1$ and the mobile user stations $MS_1, \ldots, MS_K$ usually provide a multipath environment for both the uplink and the downlink communications.

Figure 3:
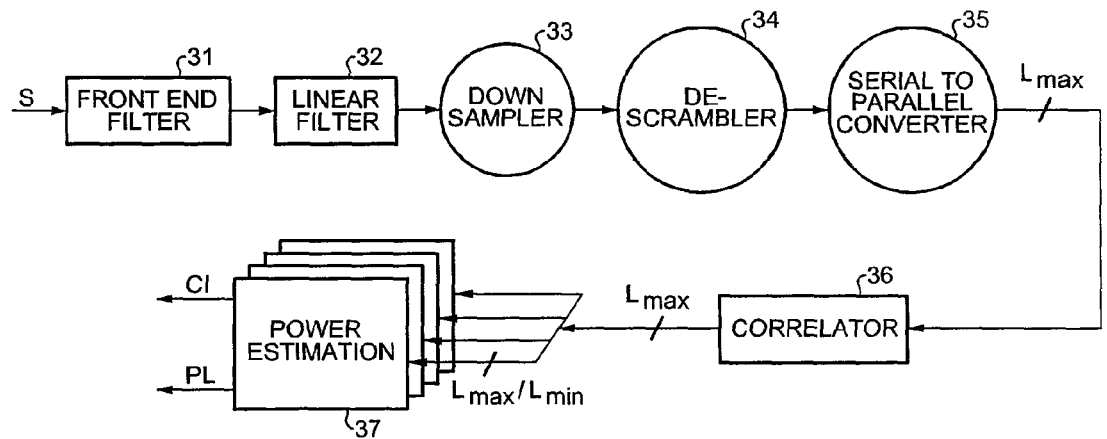
FIG. 3 shows a device for detection of active spreading codes for a signal in a communication system and estimation of powers of the active spreading codes in accordance with an embodiment of the present invention.

FIG. 3 shows a device for detection of active spreading codes for a signal in a communication system and estimation of powers of the active spreading codes in accordance with an embodiment of the present invention. There, said device is a receiver of a mobile user station in UMTS FDD (Universal Mobile Telecommunications System Frequency Division Duplex) downlink where user symbols are spread by factors ranging from 4 to 512. In the present embodiment, said receiver of a mobile station itself represents an equaliser where each user code is allocated a single correlator. The receiver comprises: front-end filtering means 31; linear filtering means 32; down-sampling means 33; descrambling means 34; serial-to-parallel converter means 35; correlation means 36; and activity determination and power estimation means 37.

Firstly, in the receiver the signal s received from a base station is passed through analogue front-end filtering means 31 before being sampled. In case of chip rate sampling, the filter used by filtering means 31 could be the pulse shape matched filter in order to satisfy the Nyquist criterion whereby the Nyquist or critical frequency is at least as large as the bandwidth of the signal being sampled (or the maximum frequency if the signal is a base band signal). In case of over-sampling, i.e. sampling frequency is higher than twice the Nyquist frequency, the filter used by filtering means 31 could be a low-pass filter with two-sided bandwidth equal to the sampling rate. Further, if the chip rate sampling or pulse shape matched filter is performed by filtering means 31, in linear filtering means 32 an equalising and/or matching of the propagation channel is performed. Otherwise, if in filtering means 31 the condition of over-sampling occurred, in linear filtering means 32 circumvention of the effects of both the propagation channel and the pulse shape is performed. Thereafter, the filter output sequence is down-sampled by down-sampling means 33 and descrambled by descrambling means 34.

Before the implementation, the largest active spreading factor ($L_{max}$) of the communication system is decided. For the UMTS FDD downlink, for example, $L_{max}$ could be 512.

The chip sequence at the output of the descrambling means 34 is first passed through serial-to-parallel converter means 35 and correlation means 36 for performing multiple correlations at a single level of a spreading code tree and producing output samples. Correlation means 36 is implemented in a very efficient way by fast Walsh Hadamard transformation (FWHT) at the highest spreading factor $L_{max}$ in the system. Specifically, correlations are done with all possible orthogonal codes at the level $SF=L_{max}$ of the OVSF tree. Outputs of correlation means 36 are $L_{max}$ pseudo-symbol sequences rooted from a number of actual symbol sequences from spreading factors. The use of FWHT provides the advantage of an obvious lower runtime complexity ($O(L_{max} \log_2(L_{max}))$) of correlations means 36, especially compared to multiple independent correlations, and is appropriate for implementation with custom parallel processor architectures. If M spreading codes at the level $L_{max}$ of the spreading code tree are used, the use of FWHT instead of M independent correlators decreases the complexity from $ML_{max}$ units to $L_{max} \log_2 (L_{max})$ units. For example, when the UMTS FDD downlink is regarded, the most obvious choice of value for Lm would be 512. The complexity can be still further reduced by choice of a lower value of $L_{max}$ assuming that when $L_{max}$ is 512 it only carries some low rate power control commands while there is an upload operation and hence its activity factor is very low. Thus, the level $L_{max}=256$ would be regarded when performing the multiple correlations. Further, the complexity, when $L_{max}$ parallel correlators are used, is $O(L_{max}^2)$. For example, when $L_{max}=256$ is used, a complexity gain of 16 fold can be achieved. Furthermore, the output samples produced by FWHT provide good statistics for determining the active spreading codes and their powers.

Here, it has to be noted that the architecture of the device for detection of active spreading codes for a signal and estimation of powers of the active spreading codes might vary depending on the type of receiver. In the present embodiment shown in FIG. 3, the usage of an equaliser is demonstrated where each user code is allocated at a single correlator. In the case of a classical Rake receiver implementation, where one correlator is allocated to each path of every user code, one FWHT for each path is needed and the outputs of the FWHT are added based on maximum ratio combining (MRC).

Before continuing with the activity determination and power estimation means 37, the lowest active spreading factor ($L_{min}$) of the communication system is decided. For the UMTS FDD downlink, for example, $L_{min}$ could be 4.

After the determination of the lowest active spreading factor ($L_{min}$), the output samples, or $L_{max}$ pseudo-symbol sequences rooted from a number of actual symbol sequences from spreading factors $L_{max}/2^m$ with $m \in \{0, 1, \ldots, \log_2(L_{max}/L_{min})\}$ and produced by FWHT in correlations means 36, are observed and analysed by the activity determination and power estimation means 37. There, the activity for all existing spreading codes is decided by extracting and processing information from the output samples by $L_{min}$ independent spreading code detectors and spreading code power estimators wherein each of said detector and estimator provides spreading code indicators CI and corresponding power levels PL as outputs.

As mentioned above, the present embodiment shows the use of an equaliser for the interference cancellation purposes, but another implementation could use a Rake receiver. Here, it should be noted that both the equaliser and the Rake receiver do not have to be separate modules of an interference canceller. In fact, Rake receiver or equalisers can be rather building blocks of interference cancellers. In such a case, each iteration of the interference cancellers, such as parallel interference cancellation (PIC) or serial interference cancellation (SIC), can be implemented as a Rake receiver or equaliser. Furthermore, the scheme can be repeated at a selected subset of interference canceller iterations. Thus the performance can be improved considerably through higher interference cancellation iterations.

Further, the target receivers are not limited to interference cancellers. Rather, any receiver that requires the code and power knowledge of unknown users can benefit from the above presented scheme. An example of such an equaliser is a decision-directed adaptive equaliser scheme that uses a training sequence such as a pilot tone. For the FDD downlink, for example, the CPICH pilot tone could be used for the training purposes. A decision-directed adaptive equaliser scheme can be implemented via LMS, or RLS etc. After the detection of the active spreading codes and the estimation of their powers, detection of the symbols of the corresponding spreading codes can be performed. These detected symbols can further be combined with the pilot tone to train the decision-directed adaptive equaliser. Consequently, the power of the "effective" training signal and thus also the performance of the equaliser can be improved.

Figure 4:
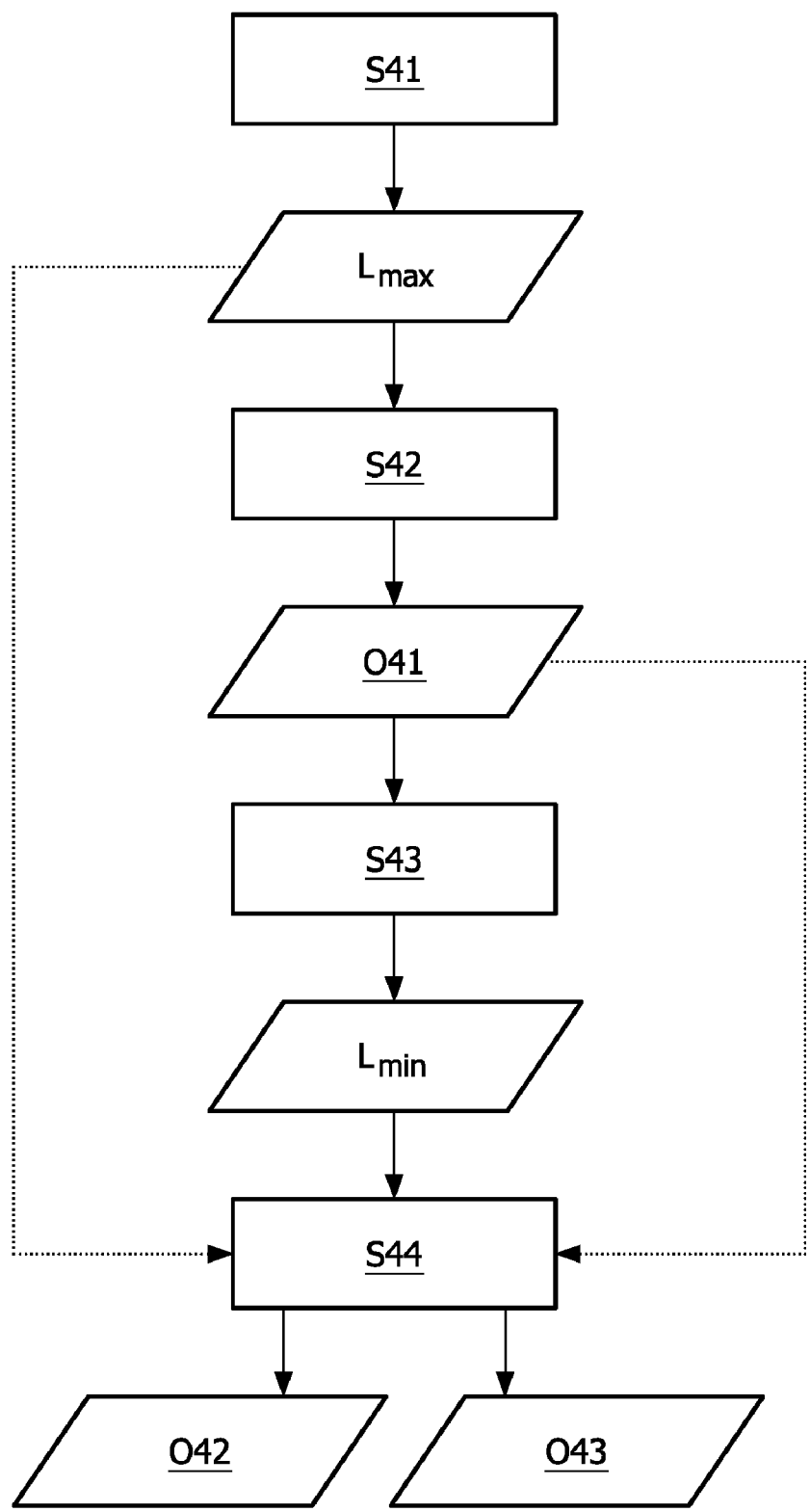
FIG. 4 shows a flowchart of a method for detection of active spreading codes for a signal in a communication system and estimation of powers of the active spreading codes in accordance with an embodiment of the present invention.

FIG. 4 shows a flowchart of a method for detection of active spreading codes for a signal in a communication system and estimation of powers of the active spreading codes in accordance with an embodiment of the present invention. The method is partly explained by use of terms and values of the preceding embodiment represented in FIG. 3. In the present embodiment there is a method for blind detection of active spreading codes and the estimation of their powers in a multi-rate direct sequence code division multiple access system (DS-CDMA) where spreading codes of different users fall into possibly different levels in an orthogonal variable spreading factor (OVSF) tree. Active spreading codes are detected for a signal in a communication system wherein the received signal comprises a sequence of data symbols that are spread in the received signal wherein the spreading is defined by a spreading code and/or a spreading factor.

In the present embodiment, at the first step (S41) of the method the largest active spreading factor $L_{max}$ of the communication system is decided. For the UMTS FDD downlink, for example, $L_{max}$ could be 512. Further, at the step S42 correlations with all possible orthogonal codes at a single level of the OVSF tree, the maximum spreading factor $L_{max}$, are performed by use of Fast Walsh Hadamard Transformation (FWHT). The use of FWHT provides the advantage of a lower runtime complexity ($O(L_{max} \log_2(L_{max}))$) of the step of performing multiple correlations (S42), especially, compared to multiple independent correlations, and is appropriate for implementation with custom parallel processor architectures. If M spreading codes at the level $L_{max}$ of the spreading code tree are considered, the use of FWHT instead of M independent correlators decreases the complexity from $ML_{max}$ units to $L_{max} \log_2(L_{max})$ units. For example, when the UMTS FDD downlink is regarded, the most obvious value of $L_{max}$ would be 512. The complexity can be still further reduced by the choice of a lower value of $L_{max}$, assuming that when $L_{max}$ is 512 it only carries some low rate power control commands while there is an upload operation and hence its activity factor is very low. Thus, the level $L_{max}$=256 would be regarded when performing the multiple correlations. In the correlation step (S42) $L_{max}$ pseudo-symbol sequences (O41) rooted from a number of actual symbol sequences from spreading factors $L_{max}/2^m$, $m \in \{0, 1, \ldots, \log_2(L_{max}/L_{min})\}$ are obtained. The output samples produced by FWHT provide good statistics for determining the active spreading codes and their powers. The complexity of the correlation step (S42), when $L_{max}$ parallel correlators are used, is $O(L_{max}^2)$. For example, when $L_{max}$=256 is used, a complexity gain of 16 fold can be achieved by means of parallel correlators.

In step S43, the lowest active spreading factor ($L_{min}$) of the communication system is decided. For the UMTS FDD downlink, for example, $L_{min}$ could be 4. After the determination of the lowest active spreading factor ($L_{min}$) in the step S43, the output samples or $L_{max}$ pseudo-symbol sequences O41 produced in the correlation step S42 are observed and analysed at the activity determination and power estimation step S44 by extracting and processing information from the $L_{max}$ output samples O41. After execution of the activity determination and power estimation step S44 code, indicators O42 and corresponding power levels O43 are provided.

Figure 5:
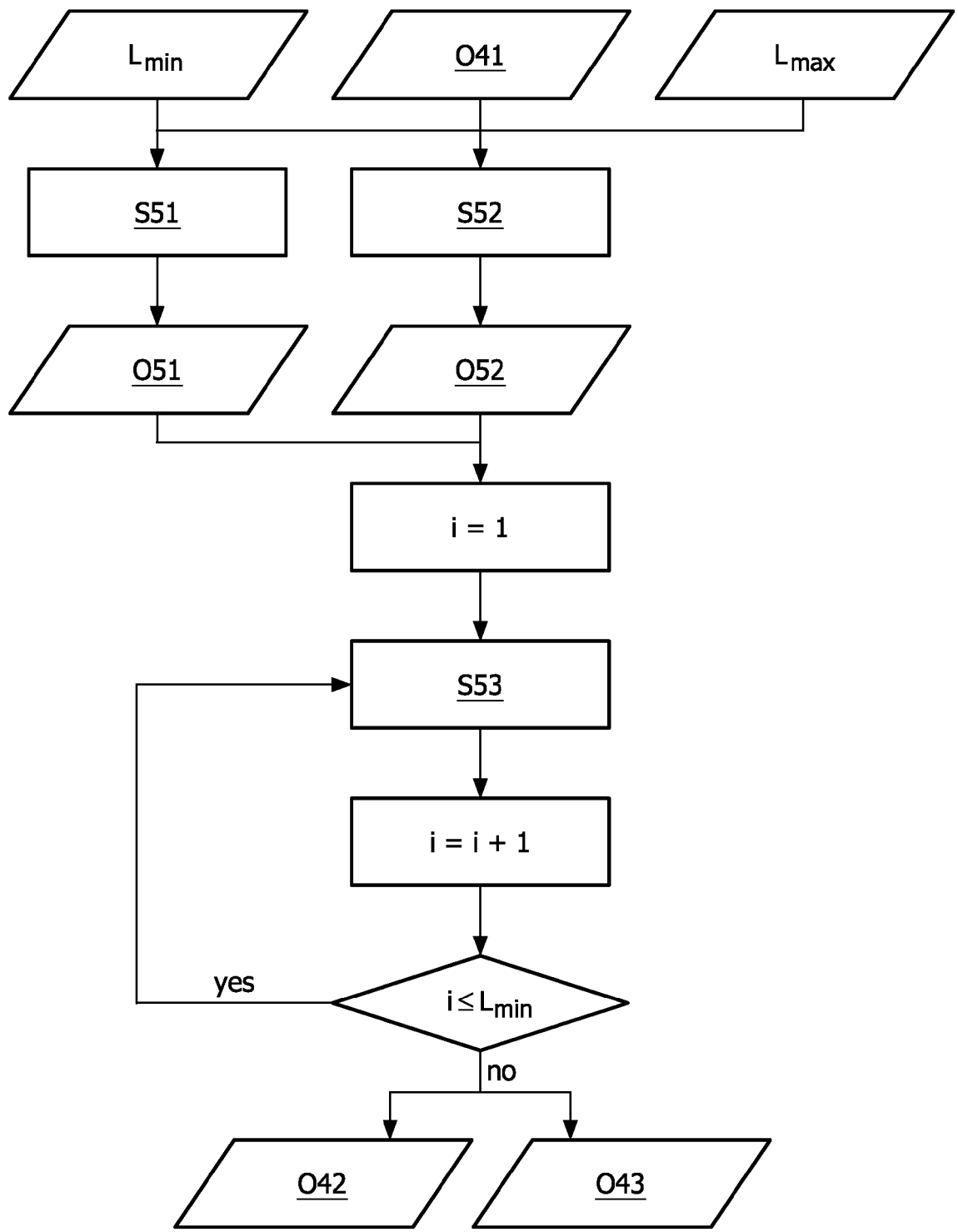
FIG. 5 shows a flowchart of an activity determination and power estimation step in accordance with an embodiment of the present invention.

FIG. 5 shows a flowchart of an activity determination and power estimation step in accordance with an embodiment of the present invention. Before turning to the embodiment of the FIG. 5, the fact that multi-rate can be modelled as multi-codes in the OVSF structure has to be mentioned. Thus, when the symbol sequence carried on a particular spreading code $c_{n,k}$ in the OVSF tree is partitioned into groups of $2^m$ symbols, one group of symbols can be considered equivalent to combinations of $2^m$ equal-variance pseudo-symbols carried on its child codes $\{c_{2^m n, 2^m k}, c_{2^m n, 2^m k+1}, \ldots, c_{2^m n, 2^m (k+1)-1}\}$.

In the present embodiment, at the step S51 the OVSF tree is divided into many independent OVSF trees (O51) rooted from the level $L_{max}$ of the OVSF tree. In the step S52 the $L_{max}$ output samples (O41) obtained after the execution of the correlation step (S42) are partitioned into $L_{min}$ groups G, of $L_{max}/L_{min}$ elements, where each group $G_i$, $i = \{1, \ldots, L_{min}\}$, comprises output samples $\{F_i, F_{i+L_{min}}, \ldots, F_{i+(L_{max}-L_{min})}\}$. The output of the step S52 representing the groups $G_i$ is given by the element O52 in the present embodiment. Further, each group $G_i$ with $i=\{1, \ldots, L_{min}\}$ from O52 is examined and worked through separately. The activity determination and power estimation at the step S53 is performed in groups. For ease of visualisation, a sequential execution of the step S53 for each group $G_i$ is shown in the present embodiment. Generally, the manner of treatment of the groups $G_i$ is optional and can for example be done in either a sequential or a parallel way. Also the manner of choosing the group G, to execute the step S53 is not prescribed by the present embodiment.

If, for example, $L_{min}$ is 4, then there will be 4 independent logical OVSF trees (O51) and there will be $L_{max}/4$ outputs (O41) of the correlation step (S42) at the spreading factor level $L_{max}$ corresponding to the outer branches of each logical tree. If, on the other hand $L_{min}$ is 16, then there will be 16 independent logical OVSF trees and there will be $L_{max}/16$ outputs (O41) of the correlation step (S42) at the spreading factor level $L_{max}$ corresponding to the outer branches of each logical tree.

Figure 6:
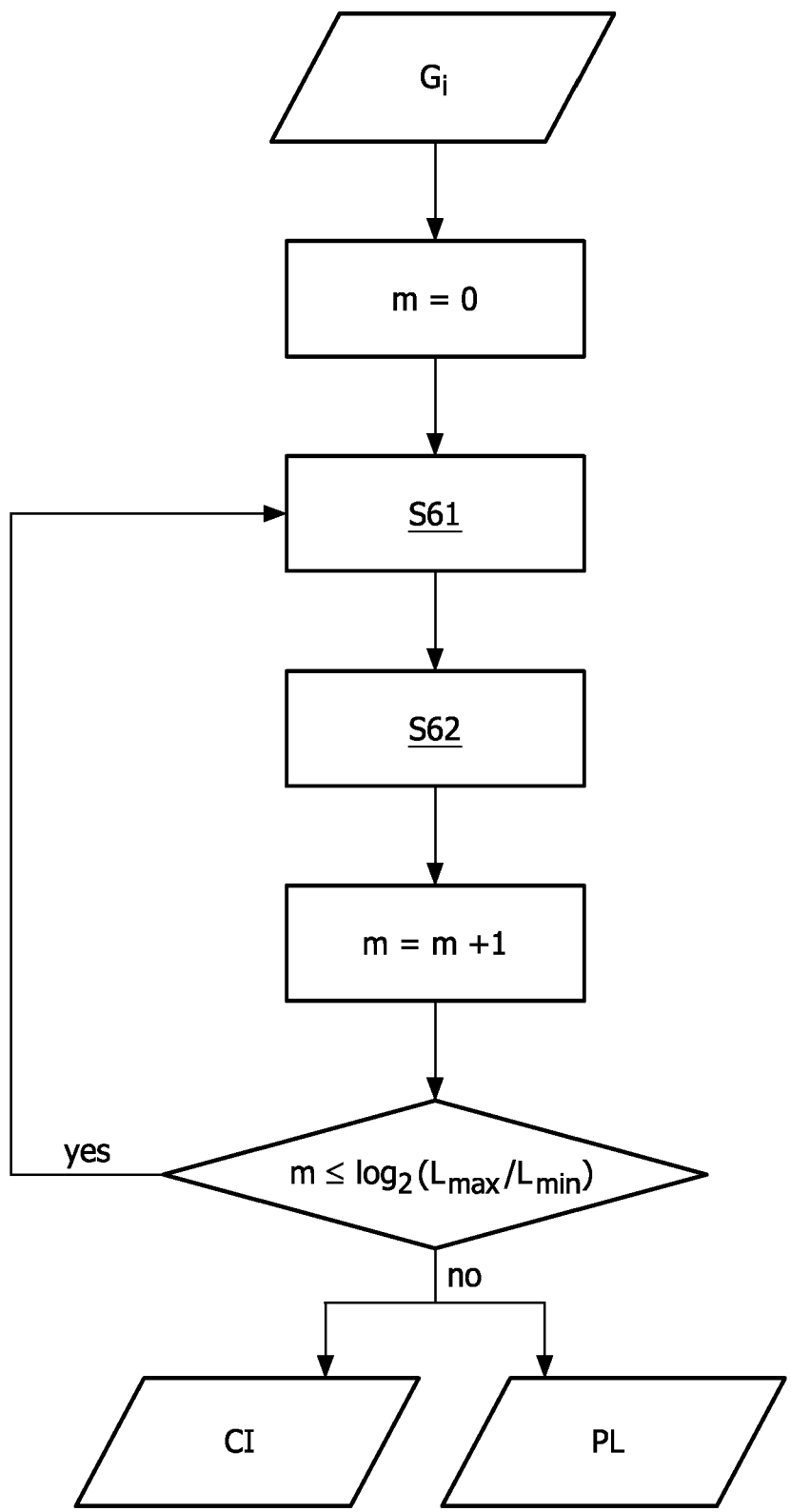
FIG. 6 shows a flowchart of activity determination and power estimation per group of output samples in accordance with an embodiment of the present invention.

FIG. 6 shows a flowchart of activity determination and power estimation per group of output samples (S53) in accordance with an embodiment of the present invention. On the basis of the description of the steps of the previous embodiment, the step S53 is described more in detail by the present embodiment. There, a certain group $G_i$ is regarded as an input to determine the activity and estimate the power of the spreading codes. As mentioned above, the pseudo-symbol sequences or output samples of the group are rooted from a number of actual symbol sequences from spreading factors $L_{max}/2^m$ where $m \in \{0, 1, \ldots, \log_2(L_{max}/L_{min})\}$. The step of activity determination and power estimation (S53) is performed by checking spreading codes from various m values. Further, the search for the active codes is done independently from samples in each group on the corresponding logical tree. In the present embodiment $m \in \{0, 1, \ldots, \log_2(L_{max}/L_{min})\}$ is considered. For each m value, groups of $2^m$ output samples of pseudo-sequences comprised in $G_i$ are built at the step S61. Further, at the step S62, activity determination is performed by comparison of the elements of the subgroups and/or by amplitude hypothesis examination. The output of the sub method (S53) presented by the present embodiment are code indicators CI and corresponding power levels PL for the group $G_i$ where $CI \subset O42$ and $PL \subset O43$.

Figure 7:
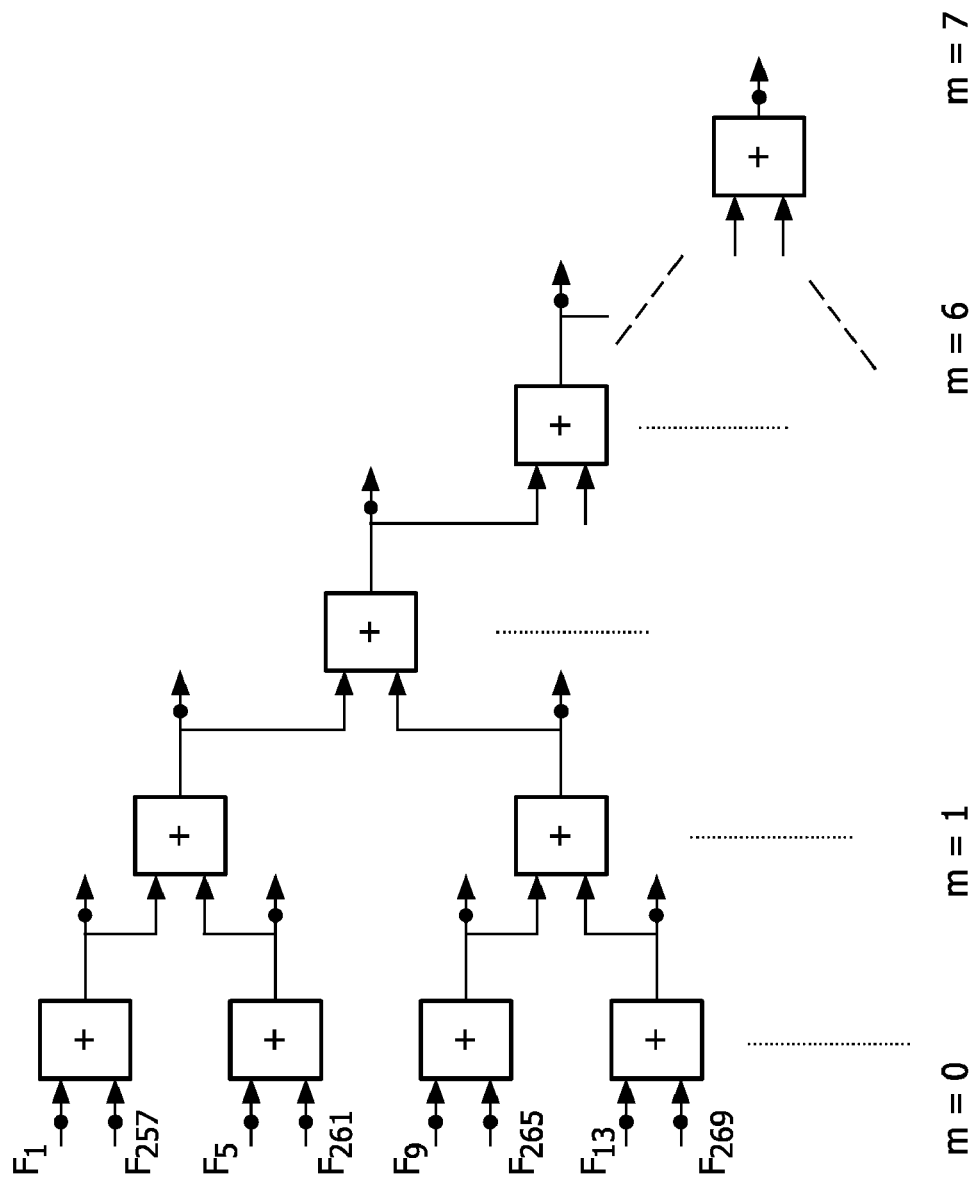
FIG. 7 shows a group of FWHT outputs for a homogenous search mechanism in accordance with an embodiment of the present invention.

Without loss of generality, the general UMTS FDD downlink scenario with $L_{max}=512$, $L_{min}=4$ and QPSK as single modulation scheme will be considered to give an concrete example. At level 512, the FWHT outputs are partitioned into groups of 128 elements. Each group $G_i$ ($i=\{1, 2, 3, 4\}$) has FWHT outputs $\{F_i, F_{i+4}, \ldots, F_{i+508}\}$. The search for the active codes is performed independently from samples in each group on the corresponding logical tree. The first group is shown in FIG. 7 for example. There, the relevant output set is $\{F_1, F_5, \ldots, F_{509}\}$. For activity checking, all these 128 outputs are considered separately for m=0. For m=1, samples are treated in groups of two elements as $\{(F_1,F_{257}), (F_5, F_{261}), \ldots, (F_{253},F_{509})\}$. For m=2, samples are treated in groups of four elements as $\{(F_1, F_{257}, F_{129}, F_{385}), (F_5, F_{261}, F_{133}, F_{389}), \ldots, (F_{125}, F_{381}, F_{253}, F_{509})\}$ and eventually for m=7 all elements are treated jointly.

Next, the activity determination is discussed more in detail for the first m values.

For m=0, every actual symbol $\{b_{1,1}\}$ from level $L_{max}$ of the OVSF tree will also be the pseudo-symbol $\tilde{b}_{1,1}$ at a particular correlator output. So, for QPSK (Quadrature Phase-shift Keying) modulation as used for the UMTS downlink, absolute values of the real/imaginary outputs from any correlator are expected to have almost a single amplitude. The activity of corresponding spreading code can be determined by comparison of the largest and smallest observed elements. If they are close, then the corresponding spreading code is decided to be active.

For m=1, if every 2 actual symbols from level $$\frac{L_{max}}{2},$$

as $\{b_{2,1}, b_{2,2}\}$, are grouped, the corresponding two pseudo-symbols at level $L_{max}$ will be $$\tilde{b}_{2,1} = \frac{1}{\sqrt{2}}(b_{2,1} + b_{2,2}) \text{ and } \tilde{b}_{2,2} = \frac{1}{\sqrt{2}}(b_{2,1} - b_{2,2}).$$

Actual group symbol estimates are then obtained as $$\hat{b}_{2,1} = \frac{1}{\sqrt{2}}(\tilde{b}_{2,1} + \tilde{b}_{2,2}) \text{ and } \hat{b}_{2,2} = \frac{1}{\sqrt{2}}(\tilde{b}_{2,1} - \tilde{b}_{2,2}).$$

A property which has to be exploited is that, for QPSK modulation, if there is activity at level $$\frac{L_{max}}{2},$$

then the absolute values of the real/imaginary parts of every $\{\tilde{b}_{2,1}, \tilde{b}_{2,2}\}$ couple match a scaled form of $\{0,1\}$ or $\{1,0\}$. In other words, if the absolute values of the real/imaginary samples of the pseudo-symbol sequence couple for a certain period are gathered, exactly half of them will be 0 and the other half will be a constant. Thus, three options of checking the activity of a code at level $$\frac{L_{max}}{2}$$

are given:

1. Estimating $\hat{b}_{2,1}$ and/or $\hat{b}_{2,2}$ sequences by combining $\tilde{b}_{2,1}$ and $\tilde{b}_{2,2}$ via addition/subtraction and checking the single amplitude hypotheses.

2. Element-wise comparing the pseudo-symbol couples, checking the $\{0,1\}$ pattern and testing single amplitude hypotheses in the set containing larger elements from comparisons.

3. Collecting samples from the couple in a buffer, sorting the samples, testing the single amplitude hypothesis on the larger half and testing the amplitude difference, i.e $\{0,1\}$ hypothesis between larger and smaller halves.

Methods two and three eliminate the need to get symbol estimates at every level. Instead, every two consecutive levels are sufficient. One method might be more advantageous than the others in terms of speed and area depending on the type of implementation.

Turning back to the m values, for m=2 every 4 actual symbols are grouped from level $$\frac{L_{max}}{4}$$

as $\{b_{4,1}, b_{4,2}, b_{4,3}, b_{4,4}\}$, the corresponding 4 pseudo-symbols at level $L_{max}$ will be $$\tilde{b}_{4,1} = \frac{1}{2}(b_{4,1} + b_{4,2} + b_{4,3} + b_{4,4}),$$

$$\tilde{b}_{4,2} = \frac{1}{2}(b_{4,1} + b_{4,2} - b_{4,3} - b_{4,4}),$$

$$\tilde{b}_{4,3} = \frac{1}{2}(b_{4,1} - b_{4,2} + b_{4,3} - b_{4,4}), \text{ and}$$

$$\tilde{b}_{4,4} = \frac{1}{2}(b_{4,1} - b_{4,2} - b_{4,3} + b_{4,4}).$$

Actual group symbol estimates can then be obtained as:

$$\hat{b}_{4,1} = \frac{1}{2}(\tilde{b}_{4,1} + \tilde{b}_{4,2} + \tilde{b}_{4,1} + \tilde{b}_{4,2}),$$

$$\hat{b}_{4,2} = \frac{1}{2}(\tilde{b}_{4,1} + \tilde{b}_{4,2} - \tilde{b}_{4,1} - \tilde{b}_{4,2}),$$

$$\hat{b}_{4,3} = \frac{1}{2}(\tilde{b}_{4,1} - \tilde{b}_{4,2} + \tilde{b}_{4,1} - \tilde{b}_{4,2}), \text{ and}$$

$$\hat{b}_{4,4} = \frac{1}{2}(\tilde{b}_{4,1} - \tilde{b}_{4,2} - \tilde{b}_{4,1} + \tilde{b}_{4,2}).$$

For the ease of further processing, the observation of the m values is limited to only the first elements of estimated actual symbols from multiple levels. Thus, for every level $$\frac{L_{max}}{2^m}, 2^m$$

symbols are considered. There, only the real/imaginary amplitudes corresponding to the first symbols are estimated which have the form of $$\hat{b}_{2^m,1} = \frac{1}{2^{m/2}} \sum_{t=1}^{2^m} \tilde{b}_{2^m,t}.$$

In this manner, an equal number of symbols is checked from multiple levels of the OVSF tree thus enabling a reuse of some hardware blocks in implementation.

Initially, the scaling coefficient in the front of the sum operation can be ignored. In that case, if an appropriate spreading code could be determined as active, the scaling coefficient can be introduced later for power calculations.

Additionally, like the case for level $$\frac{L_{max}}{2},$$

for many spreading codes it is not necessary to get amplitude estimates from various levels directly. For the spreading codes at these levels the activity checking can be done from pseudo-symbol amplitude estimate couples from their closest parent codes. In the present invention, the activity search mechanism through symbol estimations for all codes is called homogenous search and, when at least one implementation of above mentioned methods two and three is regarded, the term hybrid search mechanism is used.

Implementations of the detection of active spreading codes and the estimations of their powers can be done serially, where the hypothesis is checked with each new sample, or block-wise, where the samples are buffered and where the hypothesis is tested through collected samples.

Figure 8:
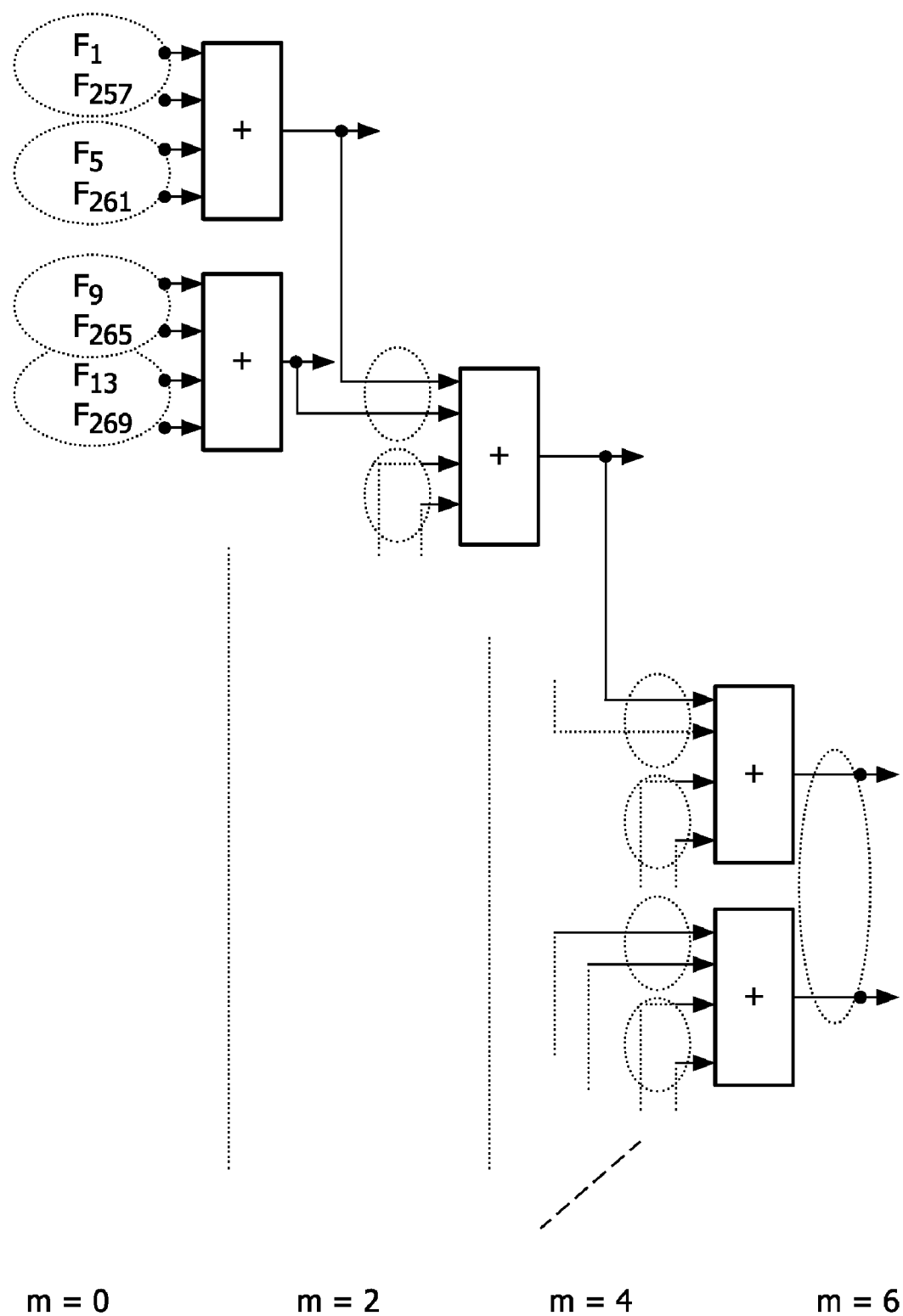
FIG. 8 shows a hybrid search mechanism in accordance with an embodiment of the present invention.
Figure 9:
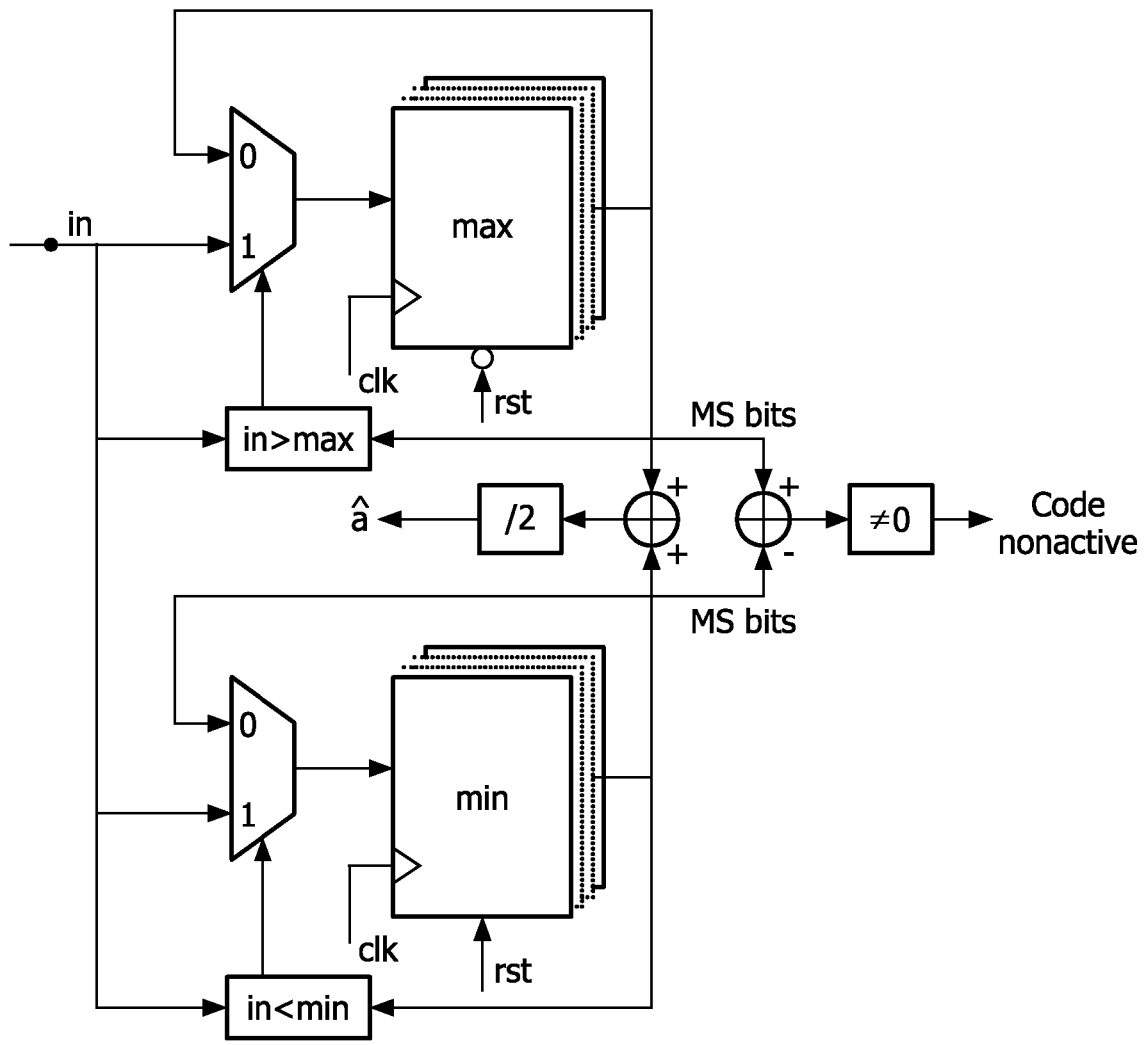
FIG. 9 shows a serial implementation of the detection of active spreading codes and the estimations of their powers in accordance with an embodiment of the present invention.
Figure 10:
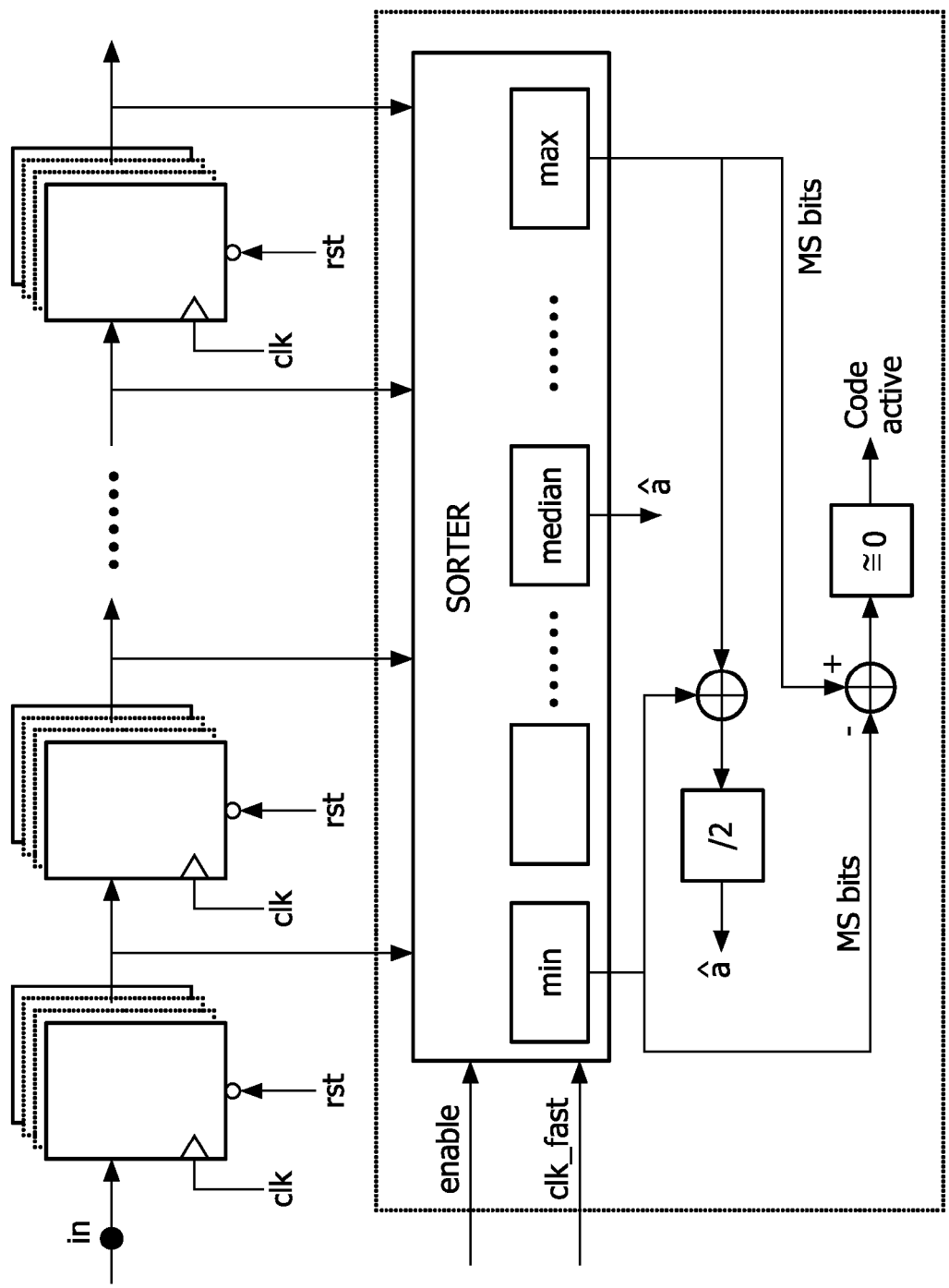
FIG. 10 shows a block implementation of the detection of active spreading codes and the estimations of their powers in accordance with an embodiment of the present invention.

An example of homogenous search mechanism is shown in FIG. 7. A demonstration of a hybrid search mechanism is shown in FIG. 8 where the symbol estimation is done on every two levels. Symbol estimates for m=$\{0, 2, 4, 6\}$ are exploited also for the checks for m=$\{1, 3, 5, 7\}$. In both figures, the coupling of symbol estimates is given by dotted circles, dark dotted points in turn correspond to estimated symbols at various levels from the treated samples. In a later step, they are separated into real/imaginary parts. Absolute values of these parts are then calculated and fed to serial or block implementations of activity checking and coarse power estimation as shown in FIG. 9 for serial implementation and in FIG. 10 for block implementation respectively. For the setting purposes in FIG. 10, sample buffering can be done in parallel for all spreading codes, overlapping the investigation of multiple codes, and the sorting and checking mechanisms illustrated within the rectangular region can be enabled when there is a need to investigate the activity of the corresponding code. Thus, the power can be saved and the processing time can be reduced.

Additionally, the present invention provides multiple alternatives for the rough symbol amplitude estimation or power estimation on detected spreading codes. Some of a plurality of possibilities are:
1. If amplitude samples are buffered and sorted for hypothesis checking, then the middle element (for example a median value) can be taken as the amplitude estimate;
2. Mean of the sorted list can be taken as the amplitude estimate;
3. The average of the minimum and maximum element can be taken as the amplitude estimate;
4. If progressive checking with each new samples is adopted, then two registers might be allocated to keep the minimum and maximum observed outputs and in the end their average can be taken as the amplitude estimate;
5. Further, the previous methods given at items 2 or 4 can be modified to progressively recalculate the mean value with each new (FWHT) output.

Furthermore, activity checking might be done in any level order. However, it is important to follow the right track leading to the active codes sooner than other tracks. Since the moment a spreading code is detected, investigations for all its parent and child spreading codes are blocked. One straightforward way is starting from the highest level $L_{max}$ and progressively going towards the root of the OVSF tree. An alternative way is to start checking from the most probable levels. In UMTS FDD downlink for example, speech services are given at level 128. There, the first priority would be given to the level 128. Moreover, more than one level might be checked at the same time to speed up the decision. However, there care should be taken because of possibility of redundant operations consuming precious resources and time. Furthermore, mobile terminal might already know the existence of activity at some codes. The parent and child locations corresponding to those codes could then be excluded from the search. For example, PCIPCH and PCPCH occupy the first two codes at the spreading factor SF=256. A mobile terminal knows its own code or multi-codes and might also know the existence of some HSDCSH codes.

When regarding the determination of values $L_{max}$ and $L_{min}$, still some additional words must be said here. In some embodiments of the present invention $L_{max}$ was set to be 512 for the UMTS FDD downlink. In order to decrease the complexity of the activity decision process provided by the activity determination and power estimation means 37, spreading factor of value 512 might be ignored for interference cancellation purposes since it carries only some low rate power control commands while there is an upload operation and hence its activity factor is very low. Further, in the embodiment of the present invention represented in FIG. 3, $L_{min}$ was set to be 4 for the UMTS FDD downlink. In certain conditions, the spreading factor range might be more constrained. If, for example, there is high speed packet data access (HSDPA) service, $L_{min}$ can be considered as 16 since there is no advantage in using spreading factors 4/8 instead of respectively using 4/2 multi-codes at spreading factor SF=16. For interference cancellation purposes, this constraint is a reasonable assumption. When a HSDPA service is used there is also the possibility of 16-QAM modulation. In such a case, symbols at the HSDPA service level can be estimated and a finite alphabet but not a single amplitude hypothesis can be checked. For this, absolute real and/or imaginary samples can first be buffered and sorted. Afterwards, the hypothesis of the ratio of three between the maximum and minimum elements of the sorted list is checked.

It is noted that the present invention is not restricted to any specific embodiment or a restrictive performance of presented methodology. As illustrated by the above described alternative solutions there are many ways of combinations and alternative executions corresponding the presented method. Thus, the preferred embodiments may vary within the scope of the attached claims.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A device for detection of active spreading codes for a signal in a communication system and estimation of powers of the active spreading codes, wherein a received signal comprises a sequence of data symbols that are spread in the received signal and the spreading is defined by a spreading code and/or a spreading factor, wherein the device comprises:
    correlation means for performing multiple correlations at a single level of a spreading code tree and producing output samples, said multiple correlations comprising:
    performing first multiple correlations with all possible orthogonal codes at a level spreading factor=Lmax, where Lmax is the largest active spreading factor of the communication system; and
    then performing multiple correlations with all possible orthogonal codes at a level spreading factor=Lmin, wherein Lmin is the lowest active spreading factor of the communication system; and
    activity determination and power estimation means for observing said output samples produced at said Lmax and Lmin level, deciding on activity for all existing codes, and estimating powers of active spreading codes by extracting and processing information from said output samples.

2. The device according to claim 1, wherein the correlation means are implemented by parallel correlators.

3. The device according to claim 1, wherein the activity determination and power estimation means feature parallel implementation.

4. The device according to claim 1, wherein the device represents a receiver in a communication system.

5. The device according to claim 1, wherein the device represents an equalizer in a communication system.

6. The device according to claim 1, wherein the device represents a Rake receiver in a communication system.

7. The device according to claim 1, wherein the device represents a decision-directed adaptive equalizer.

8. The device according to claim 7, wherein the decision-directed adaptive equalizer uses a training sequence.

9. The device according to claim 8, wherein the training sequence is a pilot tone.

10. The device according to claim 7, wherein the decision-directed adaptive equalizer is trained by the symbols of spreading codes detected by the activity determination and power estimation means.

11. The device according to claim 7, wherein the device is a building block of an interference canceller.

12. Use of the device according to claim 7 to cancel interference in a communication system.

13. Use of the device as claimed in claim 12, wherein the interference cancellation is a parallel interference cancellation.

14. Use of the device as claimed in claim 12, wherein the interference cancellation is a serial interference cancellation.

15. A method of detecting active spreading codes for a signal in a communication system and estimation of powers of the active spreading codes, wherein a received signal comprises a sequence of data symbols that are spread in the received signal and the spreading is defined by a spreading code and/or a spreading factor, wherein the method comprises:
    a first step of performing multiple correlations at a single level of a spreading code tree and producing output samples; and
    a second step of observing said output samples produced at said single level, deciding on activity for all existing codes, and estimating powers of the active spreading codes via extracting and processing information from said output samples,
    wherein said first and second step being first executed with all possible orthogonal codes at a level spreading factor=Lmax, where Lmax is the largest active spreading factor of the communications system and then with all possible orthogonal codes at a level spreading factor=Lmin, where Lmin is the lowest active spreading factor of the communication system.

16. The method according to claim 15, wherein spreading codes of different users fall into different levels of said spreading code tree.

17. The method according to claim 15, wherein said first step is implemented by fast Walsh Hadamard transformation (FWHT).

18. The method according to claim 15, wherein said first step is performed at the highest spreading factor in use in the system.

19. The method according to claim 15 further comprising the step of observing said output samples during a defined period in the second step.

20. The method according to claim 15 further comprising the step of partitioning said output samples into groups of a predetermined number of elements in said second step.

21. The method according to claim 20 further comprising the step of performing activity determination and power estimation in said second step for each of said groups.

22. The method according to claim 21 further comprising the step of analyzing elements of groups of said output samples by partitioning the elements of a group in subgroups of various lengths comprising at least one element, wherein said spreading code tree is partitioned in sub trees, and wherein the activity determination and power estimation is performed by analyzing elements of the subgroups and codes of the sub trees of said spreading code tree and/or by amplitude hypothesis examination.

23. The method according to claim 22 comprising the step of using all levels of the sub trees of said spreading code tree for the activity determination and power estimation.

24. The method according to claim 22 comprising the step of using predetermined levels of sub trees of said spreading code tree for the activity determination and power estimation.

25. The method according to claim 22 comprising the step of performing the activity determination and power estimation serially.

26. The method according to claim 22 comprising the step of performing the activity determination and power estimation blockwise.

27. The method according to claim 22, wherein the multiple correlations of the first step are performed in parallel.

28. A non-transitory computer program medium comprising code means for performing the steps of claim 15 when run on computer controlled device.

* * * * *

UNITED STATES PATENT AND TRADEMARK OFFICE
CERTIFICATE OF CORRECTION

| | |
|---|---|
| PATENT NO. | : 8,199,793 B2 |
| APPLICATION NO. | : 12/096217 |
| DATED | : June 12, 2012 |
| INVENTOR(S) | : Ahmet Bastug and Fabrizio Tomatis |

It is certified that error appears in the above-identified patent and that said Letters Patent is hereby corrected as shown below:

Title page, Item (30) Foreign Application Priority Data, "Dec. 16, 2005" should be --Dec. 6, 2005--

Signed and Sealed this
Eighteenth Day of September, 2012

David J. Kappos
*Director of the United States Patent and Trademark Office*